Patented Aug. 13, 1929.

1,724,747

UNITED STATES PATENT OFFICE.

PETRUS M. COCHIUS, OF LEERDAM, NETHERLANDS, ASSIGNOR TO THE FIRM NAAM-LOOZE VENNOOTSCHAP GLASFABRIEK "LEERDAM" VOORHEEN JEEKEL, MIJNSSEN & CO., OF LEERDAM, NETHERLANDS.

PROCESS OF PREPARING VITRIFIED MATERIAL.

No Drawing. Application filed March 3, 1923, Serial No. 622,676, and in the Netherlands August 4, 1922.

The present invention relates to the preparation of a new material having special properties and useful for a large number of purposes. It is inert, i. e. not readily affected by air, water, or other common agencies and can be referred to as "glass-granite" because it is not similar in appearance to ordinary glass.

In preparing the new material, ordinary glass-making materials can be mixed, such as soda, lime and sand (the amount of sand being much greater than used in making glass) to form the starting material. Old glass also can be used. The term "glass material" is intended to embrace either the glass-making batch or old glass.

*Example 1.*—100 to 400 parts of sand can be mixed with 35 parts of soda, 17 parts of calcspar (marble), 5 parts of bone meal and 0.1 part of cobalt, and heated until the fluxing materials (but not all of the sand) have melted.

In this example 20 parts of kaolin can be substituted for 10 parts of the sand. Either bone meal or kaolin increases the opacity of the glass. The addition of these materials is recommended because, if the melting process has been carried too far, the product in the presence of the materials referred to will not obtain so quickly an undesired degree of transparency or resemblance with glass.

*Example 2.*—To 100 parts of molten glass (melted old bottles if desired) are added 40 parts of sand, 20 parts of cinders and optionally small quantities of manganese or cobalt compounds.

Generally the raw materials need not be purified; cinders for instance available in large quantities on the railways can be used. After being mixed the mass is melted in a furnace which is very rapidly done without wholly dissolving the sand. The mass can then be pressed, or if the excess of sand is not too great the material can be blown.

The molten material containing undissolved sand, can be applied for the manufacture of vases and pots for daily use or for luxury purposes; it is also possible to make tiles for pavement and blocks and other articles for building purposes. Owing to its beautiful exterior, hardness, tensile strength, etc. the material does not readily wear out or fracture.

It is of importance that the components are carefully and uniformly mixed. During the working, the melting process can proceed and the sand during this treatment will progressively dissolve by which the beautiful exterior of the product would be lost (if continued too far) and the finished tiles would have a more glassy appearance. Moreover, a possible partial unmixing which would cause the product to become partially too glassy and partially too hard to be worked, must be prevented.

The exterior of the material can be embellished by adding colour-giving or cheap waste material or both, such as old glass, bone-meal, cinders and the like. As a consequence the material is very cheap which makes it of great importance in connection with its useful properties. Exteriorly, the obtained material does not resemble glass.

It will be understood, that the idea of my invention is to obtain the desired product by not completely melting the acid components of the glass mass and that therefore part of the excess of sand may be replaced by other suitable materials, for example, kaolin, in which case 20 parts of kaolin take the place of 10 parts of sand.

I claim:

1. Process of preparing a glass-like opaque material, which comprises rendering homogeneous a glass-material with an excess of sand, partially melting in the usual way and working the mass into shaped products before the sand is wholly dissolved in the fusion.

2. Process according to the first claim, characterized in this that the exterior of the product is embellished by adding colour-giving substances.

3. In a process according to claim 1, the step of adding cinders to the mass.

4. A process according to claim 1, characterized by mixing about 100 parts of molten bottle glass, 40 parts of sand, and heating as in claim 1.

5. A process according to claim 1, characterized by mixing from 110 to 140 kg. of sand, about 35 kg. of soda, about 17 kg. of calcareous spar, about 5 kg. of bone meal and about 100 grams of cobalt.

6. A process of forming a shaped product which comprises mixing glass material and a granular solid comminuted material that does not dissolve rapidly therein when said glass material is quickly melted, then heating sufficiently to melt at least most of the said glass material, but not sufficient to melt the said comminuted solid material or to dissolve it, and then shaping the mixture by itself to form an article consisting of the said materials, such article having a structure throughout its body resembling granite.

In testimony whereof I affix my signature.

P. M. COCHIUS.